United States Patent
Jensen (10) Patent No.: US 9,049,303 B2
(45) Date of Patent: *Jun. 2, 2015

(54) AUTOMATIC PAIRING OF A TELEPHONE PERIPHERAL UNIT AND AN INTERFACE UNIT

(71) Applicant: GN Netcom A/S, Ballerup (DK)

(72) Inventor: Kim Breinholt Jensen, Hillerod (DK)

(73) Assignee: GN Netcom A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,354

(22) Filed: Jul. 22, 2014

(65) Prior Publication Data

US 2015/0080052 A1    Mar. 19, 2015

Related U.S. Application Data

(63) Continuation of application No. 13/322,482, filed as application No. PCT/DK2010/050114 on May 26, 2010, now Pat. No. 8,787,946.

(30) Foreign Application Priority Data

May 26, 2009   (EP) .................................... 09161120

(51) Int. Cl.
| | |
|---|---|
| *H04M 1/725* | (2006.01) |
| *H04M 1/21* | (2006.01) |
| *H04M 1/60* | (2006.01) |
| *H04W 12/06* | (2009.01) |
| *H04W 8/00* | (2009.01) |
| *H04L 29/06* | (2006.01) |

(52) U.S. Cl.
CPC ................ *H04M 1/725* (2013.01); *H04M 1/21* (2013.01); *H04M 1/6066* (2013.01); *H04M 1/7253* (2013.01); *H04M 1/6058* (2013.01); *H04W 12/06* (2013.01); *H04M 2250/02* (2013.01); *H04M 1/6075* (2013.01); *H04W 8/005* (2013.01); *H04L 63/061* (2013.01)

(58) Field of Classification Search
CPC ..... H04W 12/06; H04W 8/005; H04W 76/02; H04M 1/7253; H04M 1/6058; H04M 1/6066; H04M 1/6075; H04M 2250/02; H04L 63/061
See application file for complete search history.

(56) References Cited

U.S. PATENT DOCUMENTS 7,813,715 B2 * 10/2010 McKillop et al. ............. 455/410
2008/0057868 A1    3/2008 Chang (Continued)

FOREIGN PATENT DOCUMENTS

| EP | 1408708 | 4/2004 |
|---|---|---|
| EP | 1408708 A1 * | 4/2004 |

(Continued)

*Primary Examiner* — Nizar Sivji
(74) *Attorney, Agent, or Firm* — Altera Law Group, LLC (57) ABSTRACT

System for audio communication comprising: a peripheral unit and an interface unit, wherein the peripheral unit comprises a microphone and a speaker, and the peripheral unit is connectable to a telephone via the interface unit, the interface unit having a unique interface unit device address, and the peripheral unit having a unique peripheral unit device address, wherein the peripheral unit and the interface unit are mutually connectable via a wireless communication link for audio communication and via a detachable wired communication link for auxiliary data, and wherein the system further comprises automatic pairing routine for pairing the peripheral unit and the interface unit to establish the wireless communication link.

11 Claims, 5 Drawing Sheets

(56) References Cited

U.S. PATENT DOCUMENTS

2008/0070501 A1* 3/2008 Wyld .......................... 455/41.2
2008/0080703 A1* 4/2008 Penning et al. .......... 379/428.02
2008/0227393 A1* 9/2008 Tang et al. ................... 455/41.3

FOREIGN PATENT DOCUMENTS

| WO | WO 2007/143720 | 12/2007 |
|----|----------------|---------|
| WO | WO 2008/027910 | 3/2008  |

* cited by examiner

AUTOMATIC PAIRING OF A TELEPHONE PERIPHERAL UNIT AND AN INTERFACE UNIT

The invention relates to a system for audio communication comprising: a peripheral unit and an interface unit, wherein the peripheral unit comprises a microphone and a speaker, and the peripheral unit is connectable to a telephone via the interface unit, the interface unit having a unique interface unit device address, and the peripheral unit having a unique peripheral unit device address, wherein the peripheral unit and the interface unit are mutually connectable via a wireless communication link for audio communication and via a detachable wired communication link for auxiliary data, and wherein the system further comprises automatic pairing means for pairing the peripheral unit and the interface unit to establish the wireless communication link. Furthermore, the invention relates to a peripheral unit, to an interface unit, and to an automatic pairing method.

It is known in the art to pair a wireless telephone peripheral unit with an interface unit by having a user entering the peripheral unit in a pairing mode, and having the interface unit finding and completing pairing with the peripheral unit.

EP 1408708 discloses a system where a mobile phone via a stationary unit can establish a telephone connection to a PSTN network by means of a Bluetooth link. WO 2008/027910 discloses a method of pairing wireless devices by via a wired medium. WO 2007/143720 discloses a system where a telephone unit for wired telecommunication is connected to a wireless handset and a headset via a wireless adapter module, wherein in one embodiment the wireless adapter module may be selectively paired to a wireless handset or a wireless headset.

It is an object of the present invention to obtain a new system for audio communication, a peripheral unit, an interface unit, and an automatic pairing method, which overcome or ameliorate at least one of the disadvantages of the prior art or which provide a useful alternative.

The object is achieved according to the invention by a system for audio communication comprising: a peripheral unit and an interface unit, wherein the peripheral unit comprises a microphone and a speaker, and the peripheral unit is connectable to a telephone via the interface unit, the interface unit having a unique interface unit device address, and the peripheral unit having a unique peripheral unit device address, wherein the peripheral unit and the interface unit are mutually connectable via a wireless communication link for audio communication, and via a detachable wired communication link for auxiliary data, and wherein the system further comprises automatic pairing means for pairing the peripheral unit and the interface unit to establish the wireless communication link, the automatic pairing means comprising:

a link detection means for detecting an established wired link between the peripheral unit and the interface unit, address exchange means adapted to exchange the peripheral unit device address and/or the interface unit device address via the wired link between the peripheral unit and the interface unit when said link has been established, and a static personal identification number (PIN) for use during pairing, the PIN being shared between the interface unit and the peripheral unit. This enables the peripheral unit to be conveniently paired with the interface unit, simply by attaching and thus establishing the wired communication link between the two units. This triggers an exchange over the wired link of the device addresses, which are compared in both units to lists of devices with which connection is allowed. If the addresses are present, the two units are already paired, and no further action is needed. If, however, the units are not paired, a pairing procedure is initiated according to the applicable standards for the wireless connection. Thus, the actual pairing is known in the art. Such pairing procedures commonly require an operator to enter a PIN code on one or both devices e.g. via buttons. This is to ensure that the pairing is actually performed between the two desired units and not with a third unit within the transmission range. Since at least one of the two units knows the unique device address of the other unit, this step is not needed to authenticate the two units and may thus be omitted. On the other hand, knowledge of a shared PIN code is required by common standards to complete the pairing procedure. Therefore, a fixed PIN code may be defined for a large number of units or even all units by a manufacturer. Instead, other restrictions may be imposed on pairing, e.g. that only units from the same manufacturer are permitted to pair. The telephone may be connected to a conventional PSTN line, a VOIP line, or may even be a soft phone client. Evident to the person skilled in the art, the peripheral unit is not limited to one microphone and one speaker but may comprise multiple microphones and/or speakers.

According to one embodiment, the interface unit may prompt the user for acceptance before pairing, e.g. by requiring a press on a button, or a press on a touch screen. In the latter case, the touch screen may be adapted for displaying the current state of the interface unit and/or the state of any connected peripheral units, including the connection state.

In another embodiment of the invention, the interface unit comprises a docking area, wherein the docking area is adapted to accept at least part of the peripheral unit for storage and/or recharging, and wherein the wired communication link is established between the peripheral unit and the interface unit, when the peripheral unit is engaged in the docking area of said interface unit. A particularly user-friendly peripheral unit is achieved by configuration, since the user merely needs to insert the peripheral unit in the docking area of the interface unit to initiate pairing, and the use of external cables or the like is avoided.

In a particular embodiment, the peripheral unit is also recharged when docked in the interface unit.

In an alternative embodiment, the docking area may be provided as a separate unit or cradle, which is connected to the interface unit by a wire.

In another embodiment of the invention, the peripheral unit is a headset. Due to the generally small size of headsets, it is cumbersome to provide such a unit with multiple buttons or other types of user interface objects. Thus, a headset according to the invention is particularly user-friendly, since user interaction is mostly eliminated from the pairing procedure.

According to an alternative embodiment, the peripheral device may be a handset or a speakerphone.

In another embodiment of the invention, the wireless link is provided via DECT. In a particular embodiment of the invention, the wireless communication link provides a link according to the Digital Enhanced Cordless Telephony (DECT) standard from the European Telecommunications Standards Institute (ETSI), e.g. under the Generic Access Profile (GAP) as defined by EN 300 176-2.

In an alternative embodiment of the invention, the wireless link is provided via Bluetooth™. I.e. the wireless connection means is adapted to provide a link via Bluetooth™, e.g. via the handsfree profile or the headset profile as described in the Bluetooth™ standard.

In yet an alternative embodiment, the wireless communication link may be produced according to any other suitable wireless technology, such as ZigBee™ or WLAN.

In a particular embodiment, the wired link is produced as a serial signal transmitted over the wired connection means. The skilled person will realize that a wide choice of protocols is available for transmission of the low-bandwidth data that is to be exchanged over the link.

In another embodiment of the invention, the system comprises a secondary peripheral unit in addition to the first peripheral unit, the first peripheral unit being the primary peripheral unit, wherein the secondary peripheral unit comprises a microphone and a speaker, and the secondary peripheral unit is connectable to the telephone via the interface unit, the secondary peripheral unit having a unique device address, wherein the secondary peripheral unit and the interface unit are connectable both via a wireless communication link for audio communication and via a wired communication link for auxiliary data, the wired communication link being detachable, and wherein the interface unit is adapted to be simultaneously connectable to both the primary peripheral unit and the secondary peripheral unit by the primary wireless communication link and the secondary wireless communication link, and wherein the automatic pairing means is further adapted for pairing the secondary peripheral unit and the interface unit to establish the secondary wireless communication link by a secondary pairing, the link detection being adapted to detect the state of the primary and secondary wired link, the address exchange means being adapted to exchange the unique device addresses via the secondary wired link, and the static personal identification number (PIN) being shared between the interface unit and the primary and secondary peripheral units for use also during the secondary pairing. According to this embodiment, the interface unit is adapted for simultaneously providing wireless links to two or more peripheral units. The primary peripheral unit may e.g. be semi-permanently linked to the interface unit, while the secondary peripheral unit may be transiently linked to the interface unit. For instance, in a call centre, the primary peripheral unit may be used by a caller—the primary user—and the secondary peripheral unit may be used by a supervisor to listen in on specific phone calls.

In one embodiment, a secondary pairing is only allowed with acceptance from the user of the primary peripheral unit, i.e. the primary user. For instance a tone played in the primary peripheral unit may signal that a secondary pairing is awaiting acceptance. The primary user may e.g. accept the pairing by pushing a button on the peripheral unit.

In another embodiment of the invention, the secondary wireless communication link expires either upon completion of a currently active phone call or in case of no active call upon completion of the next phone call. The secondary link may be established either before or during a call, e.g. allowing a supervisor to follow a conversation. After the call is ended, the secondary link is terminated without user intervention. In this way, no secondary link is accidentally left active to intrude on the privacy of the primary user or to enable eavesdropping.

The object of the invention is also obtained by a telephone peripheral unit for audio communication being adapted for connection to a telephone via an interface unit, both the interface unit and the peripheral unit having unique device addresses, and wherein the peripheral unit comprises:

a microphone and a speaker, wired connection means for connecting the peripheral unit to an interface unit, the wired connection means being adapted for providing a wired communication link for auxiliary data, wireless connection means for connecting the peripheral unit to an interface unit, the wireless connection means being adapted for providing a wireless communication link for audio communication, the wireless connection means comprising:

a pairing list for containing device addresses of interface units with which the peripheral unit is allowed to establish a wireless connection, and a connection list for containing addresses of currently connected interface units, wherein only interface units present in the pairing list may be present in the connection list, and the peripheral unit further comprising:

an automatic pairing means for pairing the peripheral unit with an interface unit when the wired connection is established between the two units, the automatic pairing means comprising:

device address exchanging means for transmitting the peripheral unit device address to the connected interface unit and/or for receiving the interface unit device address from the connected interface unit over the wired link, a static personal identification number (PIN) for use during pairing, the PIN being shared between at least the connected interface unit and the peripheral unit. Evident to the skilled person, the wireless connection means of the peripheral unit and the wireless connection means of the interface unit must be of compatible types, e.g. both according to the DECT standard or both according to the Bluetooth standard.

In a particular embodiment, the peripheral unit is a headset.

In one embodiment, the peripheral unit may act both a primary peripheral unit, and as a secondary peripheral unit.

In an embodiment of the invention, the peripheral unit comprises user interaction means, such as a multi functional button. Such button may provide the user with the possibility of one or more of the following actions: Accepting an incoming call, ending an active call, turning the peripheral unit on or off, or sending a confirming action to the interface unit In a particular embodiment of the telephone peripheral unit according to the invention, the automatic pairing means further comprises link detection means for detecting the establishment of a wired communication link between the peripheral unit and an interface unit. This is advantageous for use in systems where the pairing procedure is initiated from the peripheral unit.

The object of the invention is further obtained by an interface unit for connecting a telephone peripheral unit for audio communication to a telephone, wherein both the interface unit and the peripheral unit have unique device addresses, the interface unit having a telephone side and a peripheral unit side, and wherein the interface unit on the telephone side comprises telephone connection means for relaying audio communication to and from the peripheral unit to the telephone, and wherein the interface unit on the peripheral unit side comprises:

wired connection means for connecting the interface unit to a peripheral unit, the wired connection means being adapted for providing a wired communication link for auxiliary data, wireless connection means for connecting the interface unit to a peripheral unit, the wireless connection means being adapted for providing a wireless communication link for audio communication, the wireless connection means comprising:

a pairing list for containing device addresses of peripheral units with which the interface unit is allowed to establish a wireless connection, and a connection list for containing addresses of currently connected peripheral units, wherein only peripheral units present in the pairing list may be present in the connection list, and the interface unit further comprising:

an automatic pairing means for pairing the interface unit with a peripheral unit when the wired connection is established between the two units, the automatic pairing means comprising:

link detection means for detecting the establishment of a wired link between the interface unit and a peripheral unit, device address exchanging means for transmitting the interface unit device address to the connected peripheral unit and/or for receiving the peripheral unit device address from the connected peripheral unit over the wired link, a static personal identification number (PIN) for use during pairing, the PIN being shared between at least the connected peripheral unit and the interface unit. Evident to the skilled person, the wireless connection means of the interface unit and of the peripheral unit must be adapted to establish a common link. Thus, the same choices of wireless technology apply here for the interface unit as described above for the peripheral unit.

Likewise, the wired connection means of the interface unit must complement those of the peripheral unit, which are described above.

In another embodiment of the invention, the interface unit comprises a docking area, which docking area is adapted to accept a telephone peripheral unit for docking, wherein the wired link is established between the peripheral unit and the interface unit when the peripheral unit is docked in the docking area. In this way, it is particularly convenient to establish the wired connection, as the use of external cables or the like is avoided.

In a particular embodiment, the docking area may be in the form of a cradle, e.g. for recharging the peripheral unit when not in use.

In an alternative embodiment, the docking area may be separate from the interface unit, but connected to the interface unit by a wire.

In another embodiment of the invention, the wireless connection means is adapted for providing at least a first and a second wireless communication link for audio communication, the first link being a primary link and the second link being a secondary link, the interface unit further comprising:

a secondary pairing list for containing device addresses of peripheral units with which the interface unit is allowed to establish a secondary link, a secondary connection list for containing addresses of currently connected peripheral units, wherein only peripheral units present in the secondary pairing list may be present in the secondary connection list, wherein the automatic pairing means is further adapted for pairing the interface unit with a second peripheral unit as a secondary pairing when the wired connection is established between the interface unit and the second peripheral unit. According to this embodiment, the interface unit is adapted for simultaneously providing wireless links to two or more peripheral units. For instance, the primary peripheral unit may be semi-permanently linked to the interface unit, while the secondary peripheral unit may be transiently linked to the interface unit. For instance, in a call centre, the primary peripheral unit may be used by a caller—the primary user—and the secondary peripheral unit may be used by a supervisor to listen in on specific phone calls.

In an alternative embodiment, the interface unit comprises only one common pairing list, from which candidates for both the primary and secondary connection lists may be chosen.

In one embodiment, a secondary pairing is only allowed with acceptance from the user of the primary peripheral unit, i.e. the primary user. For instance a tone played in the primary peripheral unit may signal that a secondary pairing is awaiting acceptance. The primary user may e.g. accept the pairing by pushing a button on the peripheral unit.

In a particular embodiment, the secondary link expires either upon completion of a currently active phone call or in case of no active call upon completion of the next phone call. The secondary link may be established either before or during a call, e.g. allowing a supervisor to follow a conversation. After the call is ended, the secondary link is terminated without user intervention. In this way, no secondary link is accidentally left active to intrude on the privacy of the primary user or to enable eavesdropping.

Additionally, the object of the invention is obtained by a method for automatic pairing of a telephone peripheral unit and an interface unit for connecting the peripheral unit to a telephone, wherein the peripheral unit and the interface unit are adapted for being communicatively connected via a wireless communication link, and wherein the peripheral unit and the interface unit are furthermore adapted for being communicatively connected via a wired communication link so that at a given time one unit may function as a sending unit and the other unit may function as a recipient unit, the method comprising the steps of:

a) detecting establishment of a wired link between the peripheral unit and the interface unit, b) determining if the peripheral unit and the interface unit have a common pairing, in which case the method ends, otherwise c) transferring a device address over the wired link from a sending unit, the sending unit being either the peripheral unit or the interface unit, to a recipient unit, the recipient unit being the other of the peripheral unit or the interface unit, d) initiating a conventional pairing procedure from the recipient unit for pairing the recipient unit with the sending unit. In this way, a user-friendly procedure is established, since the user merely needs to establish a wired connection between the interface unit and the peripheral unit to initiate pairing. Furthermore, the method eliminates any need for the manufacturer to pair units before packing, since the pairing is automatically performed at the initial connection. This ensures both simple packing procedure and a good user experience. The actual conventional pairing may be conducted according to various standards depending on the type of wireless link, e.g. as defined in the Digital Enhanced Cordless Telecommunications (DECT) standard or in the Bluetooth standard.

In a particularly convenient embodiment, wherein the peripheral unit is battery-powered, the wired connection is established, when the peripheral unit is connected to the interface unit for battery charging. According to this embodiment, the detection of establishment of the wired link may simply be to detect the presence of a charging voltage or current.

In one embodiment, the peripheral unit is chosen from the group of: a headset, a handset, or a speakerphone.

In a particular embodiment, the wired link is established by docking the peripheral unit in a cradle, the cradle being electrically connected to or integrated in the interface unit.

In another embodiment of the invention, both the interface unit and the peripheral unit have a common, predetermined, and static PIN code, which PIN code is used in the conventional pairing procedure of step d). Pairing procedures according to the prior art expect a user to enter a PIN code on one or both units. This is to ensure that pairing is not made accidentally or maliciously to a third unit within transmission range during the pairing. However, according to the present invention, this is prevented by only accepting pairing with the unit with the transferred device address. Therefore, a PIN code is not needed for this purpose, but nevertheless expected by the standard. Thus, to minimise user interaction in the pairing, both units are provided with a common PIN code, such as "0000", which may be statically chosen at manufacturing time. Indeed, all units from a manufacturer may be made with the same PIN code.

In another embodiment of the invention, the sending unit is the peripheral unit and the recipient unit is the interface unit. This embodiment is suitable for wireless technologies where pairing is initiated from the interface unit side. For instance, this applies if the wireless link is established as a DECT link. In this case, the peripheral unit is put in a pairing mode whereupon it awaits a pairing request from the interface unit.

In an alternative embodiment, the sending unit is the interface unit and the recipient unit is the peripheral unit.

In another embodiment of the invention, the existence of a previous common pairing is checked by comparing the device address of the sending unit with a pairing list in the recipient unit.

In another embodiment of the invention, the method further comprises the steps of:

e) upon detection of a second peripheral unit being connected to the interface unit, determining if the interface unit has no previous primary pairing with a first peripheral unit, then a primary pairing is performed between the second peripheral unit and the interface unit according to any of the preceding embodiments, and connecting the interface unit and the second peripheral unit via a second wireless communication link, or f) if the first peripheral unit is connected to the interface unit via a first wireless link, determining if a telephone call is currently in progress via the first wireless link, then g) performing a secondary pairing between the interface unit and the second peripheral unit to connect the interface unit and the second peripheral unit via a second wireless link, and transmitting the telephone call simultaneously over both the first and second wireless link, or h) in case no telephone call is currently in progress via the first wireless link, depending on a user choice, either breaking the current primary pairing and performing a new primary pairing between the interface unit and the second peripheral unit, or performing a secondary pairing between the interface unit and the second peripheral unit and connecting the interface unit and the second peripheral unit via a second wireless link. A primary pairing may be semi-permanent in the sense that it prevails until a new primary pairing is performed. Contrarily, a secondary pairing may expire after a predetermined time or a number of phone calls. A primary pairing may exist without a secondary pairing, but a secondary pairing requires a primary pairing and that the primary peripheral unit is connected. The reason for this is that the secondary peripheral unit must use the same acoustic parameters as the primary peripheral unit in order to listen in on the conversation.

In a particular embodiment, the secondary pairing expires upon first completion of a call after the secondary pairing. Thus, the secondary pairing may be performed during or before a call and remains active for only that call.

In another embodiment, completion of secondary pairing of the second peripheral unit and an interface unit requires a confirming action by a first user of the first peripheral unit. In this way, the first user is protected from a second user listening in on a conversation without the knowledge of the first user.

The invention is explained in detail below with reference to an embodiment shown in the drawings, in which.

Figure 1A:
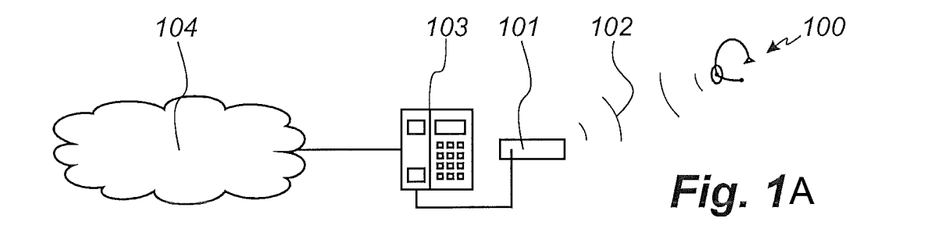
FIGS. 1a and 1b are schematic views of an embodiment of a system according to the invention.
Figure 1B:
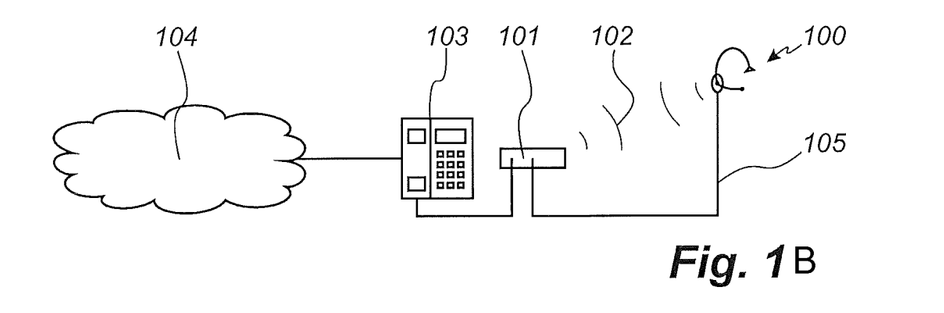

Illustrated in FIG. 1 is the inventive system. FIG. 1a illustrates the system during normal use. A peripheral unit 100, here illustrated as a headset, is connected to an interface unit 101 by a wireless link 102. The interface unit 101 is connected via a telephone 103 to a telephone network 104. FIG. 1b illustrates the system, when a wired link 105 has been established between the peripheral unit 100 and the interface unit 101. Here, the wired link 105 is shown to co-exist with the wireless link 102. However, in some cases, e.g. until wireless pairing has been completed, the wired link 105 may be the only link between the interface unit 101 and the peripheral unit 100. When the wired link 105 is established, one or both of the peripheral unit 100 or the interface unit 101 checks if the two units have been paired previously. In the affirmative case, no further actions are taken. However, if no previous pairing has been performed, the two units are paired. Whether the check is performed by the peripheral unit 100 or the interface unit 101 depends e.g. on the communication standards used for the wireless link 102.

EXAMPLE

If the wireless link is provided via DECT, the check is performed by the interface unit 101. In this case, the interface unit 101 requests the peripheral unit 100 via the wired link 105 to transmit its unique device address, the so-called International Portable Equipment Identity (IPEI), to the interface unit 101. Also transmitted from the peripheral unit 100 via the wired link 105 is the address of the device with which the peripheral unit 100 is paired, the so-called Radio Fixed Part Identity (RFPI). The interface unit 101 now compares its own RFPI address to the received RFPI, and searches for the received IPEI in the pairing list. If these two addresses are identical, the peripheral unit 100 and the interface unit 101 are already paired and no further actions need to be taken. If, however, the two addresses are not identical, the interface unit 101 requests the peripheral unit 100 via the wired link 105 to enter a paring mode. Thereafter, the interface unit 101 initiates a paring according to the DECT standard. During the paring procedure, the two units are required by the standard to have knowledge of a shared PIN code. However, as the authentication has already been performed by the transmission of the IPEI, the PIN is not needed for authentication. Thus, any number of units which support the described pairing method may be provided with the same PIN without compromising security. This is an advantage in the production, since no units needs to be paired prior to packaging as the pairing is performed automatically at the location of the end user.

Figures 2A, 2B:
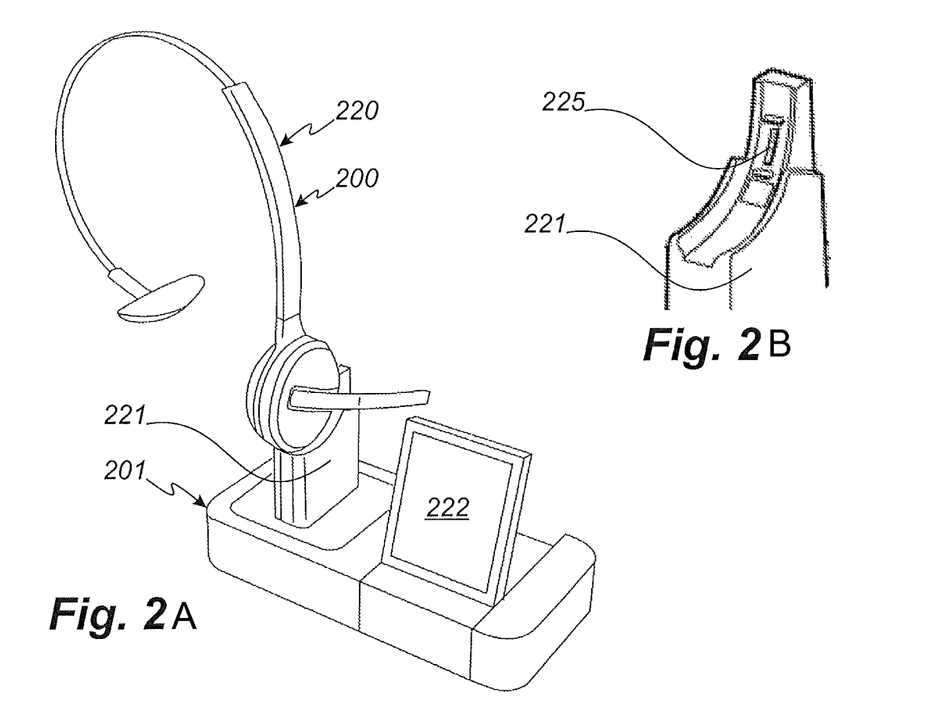
FIG. 2a is another embodiment of the invention.
FIG. 2b is a detail of the embodiment.

FIG. 2a illustrates an embodiment of the inventive system. Here, the peripheral unit 200 is shown as a headset 220. However, the peripheral unit 200 may also be a handset, a speakerphone, or any other suitable telephone peripheral unit 200 for audio communication. The headset 220 is docked in a docking area 221, whereby the wired link is established. In this embodiment, the interface unit 201 furthermore comprises a display 222, preferably a touch screen, for providing the user with information, such as the battery level of the headset 220, signal strength of the wireless link, etc. Additionally, the touch screen 222 may be used to prompt the user for e.g. acceptance of a pairing request. FIG. 2b illustrates details of the docking area, showing a number of connection points 225 in the docking area. Correspondingly, a number of connection points (not shown) are also found on the headset 220. The connection points 225 may both produce the wired link and power for recharging a battery in the headset 220.

Figure 3:
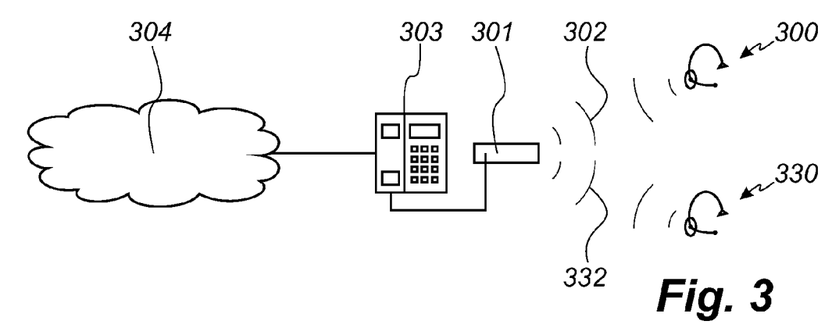
FIG. 3 is a schematic view of another embodiment of a system according to the invention.

FIG. 3 is a schematic view of an embodiment of a system according to the invention. The embodiment corresponds to the embodiment illustrated in FIG. 1, where similar reference numerals refer to similar parts. Therefore, only the differences between the two embodiments are described here. Here, the interface unit 301 is adapted for simultaneously being connected to both a primary peripheral unit 300 and a secondary peripheral unit 330. The peripheral units 300, 330 are connected to the interface unit 301 by a primary wireless link 302 and a secondary wireless link 332, respectively. Likewise, a wired link (not shown) may be established between the interface unit 301 and either the primary peripheral unit 300 or the secondary peripheral unit 330. Generally, simultaneous wired links to the two peripheral units 300, 330 are not needed. The system is here illustrated with two connected peripheral units 300, 330. However, multiple secondary peripheral units 330 may be connected simultaneously, e.g. two, three, four, five, or even more. The primary pairing of the primary peripheral unit 300 with the interface unit 301 is typically semi-permanent, e.g. belonging to the typical user of a given telephone line, whereas secondary pairings may be transient, e.g. belonging to a supervisor needing to listen in on a single or a few phone calls. Thus, the interface unit 301 may be adapted for terminating a secondary pairing after just one or a few phone calls without further user interaction. In contrast, the primary pairing remains active until replaced by another primary pairing, or e.g. until the interface unit 301 is reset.

Figure 4:
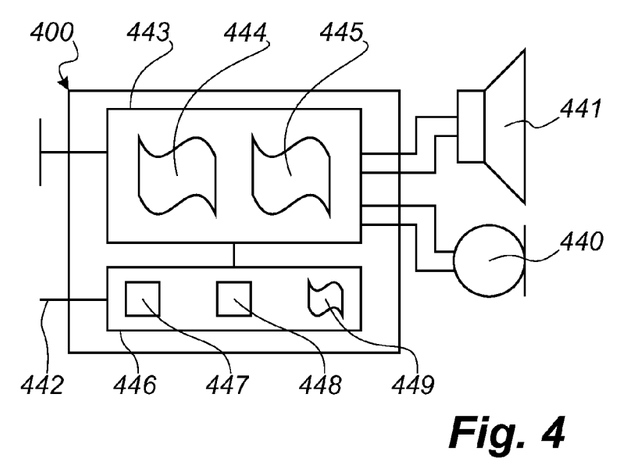
FIG. 4 is a block diagram of an embodiment of a peripheral unit according to the invention.

FIG. 4 is a block diagram of a peripheral unit 400 according to the invention. The peripheral unit 400 comprises a microphone 440 and a speaker 441. Wired connection means 442 are produced to enable establishment of a wired communication link with an interface unit. Additionally, the peripheral unit 400 comprises wireless connection means 443 for transmitting/receiving audio signals via the interface unit to/from a telephone. The wireless connection means 443 comprises a pairing list 444 that contains addresses of interface units to which the peripheral unit 440 is allowed to connect. The pairing list 444 may be updated with new entries by completing a pairing with a new interface unit. Furthermore, the wireless connection means 443 comprises a connection list 445 over addresses of interface units that the peripheral unit is currently connected to. Only entries in the pairing list 444 are possible candidates for the connection list 445. Thus, for connecting the peripheral unit to a new interface unit, the address of the interface unit must first be entered on the pairing list 444 before entering the connection list 445. To simplify pairing of the peripheral unit 400 with the interface unit, the peripheral unit 400 further comprises automatic pairing means 446. The automatic pairing means 446 may check for the establishment of the wired link by use of link detection means 447. When the wired link is established, the device address exchanging means 448 receives and/or transmits the device addresses of the interface unit and/or the peripheral unit. If the two units are not already paired, a request to enter pairing mode is either received or transmitted by the automatic pairing means 446 via the wired link. During pairing, the two units are required by common standards, such as DECT or Bluetooth™ to possess the same PIN. Therefore, the automatic pairing means 446 comprises a static PIN 449, such as "0000", which may be shared for a large number of devices.

Figure 5:
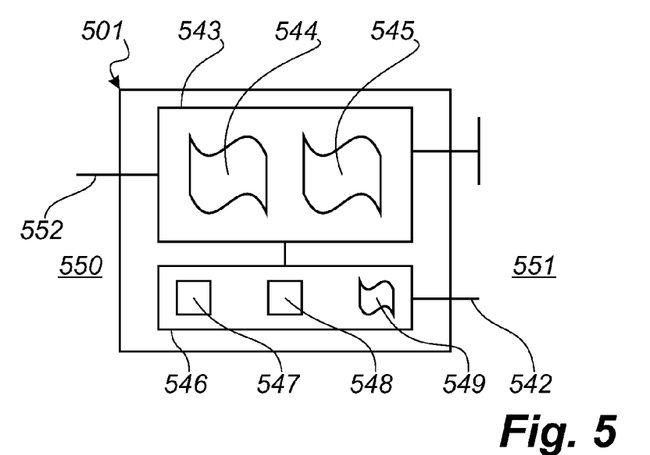
FIG. 5 is a block diagram of an embodiment of an interface unit according to the invention.

FIG. 5 is a block diagram of an interface unit 501 according to the invention. The interface unit 501 comprises telephone connection means 552 on the telephone side 550. On the peripheral unit side 551, the interface unit 501 comprises wired connection means 542 to establish a wired communication link to a peripheral unit, and wireless connection means 543 to establish a wireless communication link to a peripheral unit. The wired connection means 542 and the wireless connection means 543 of the interface unit 501 corresponds to the wired connection means 442 and the wireless connection means 443, respectively, of the peripheral unit 400 shown in FIG. 4, where like reference numerals refer to like parts. Therefore, only the differences between the two figures are described here.

Figure 6:
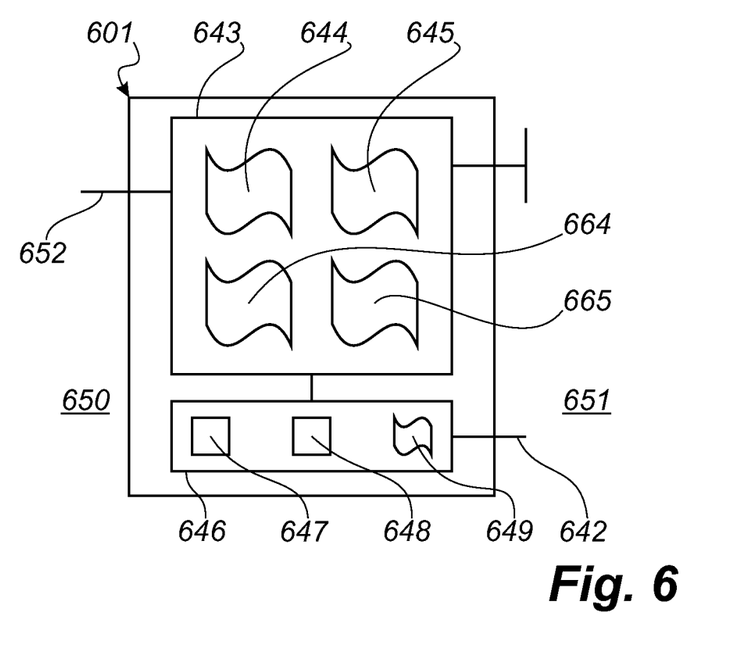
FIG. 6 is a block diagram of another embodiment of an interface unit according to the invention.

FIG. 6 is a block diagram of another embodiment of an interface unit 601 according to the invention. The embodiment corresponds to the one shown in FIG. 5, where like reference numerals refer to like parts. Therefore, only the differences between the two embodiments are discussed here. The wireless connection means 643 is adapted to have simultaneous wireless connections to both a primary and at least one secondary peripheral unit. To achieve this, the wireless connection means 643 comprises a primary pairing list 644 and a secondary pairing list 664. Analogously, two connection lists 645, 665 are comprised. Only devices, which addresses are on the pairing lists 644, 664, are candidates for the connection lists 645, 665. In an alternative embodiment, a single pairing list 644 may hold candidates for both the connection lists 645, 665. To further facilitate simultaneous wireless connections, the automatic pairing means 646 is adapted for performing both primary and secondary pairings. In case a primary pairing is in place but no call is currently active, connection of a secondary peripheral unit to the interface unit 601 may trigger either a secondary pairing, replacement of the current primary pairing, or no action. One possibility of determining which type of pairing, if any, is desired is to prompt the user, e.g. by a message on a display. No pairing may be desired, e.g. if an unpaired peripheral unit is merely connected to the interface unit 601 for recharging.

Figure 7:
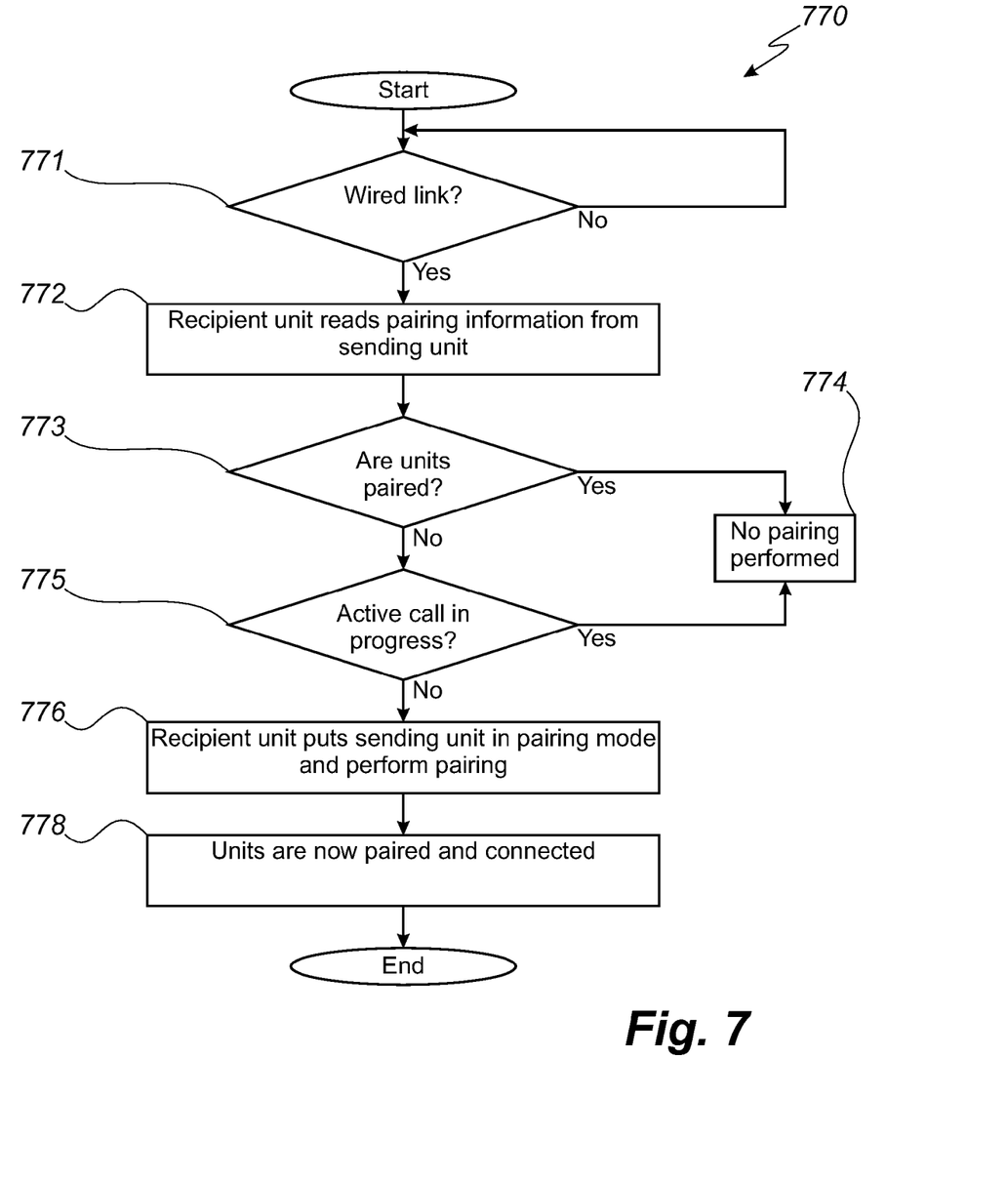
FIG. 7 is a flow chart of an embodiment of the automatic pairing method according to the invention.

FIG. 7 is a flow chart illustrating an automatic pairing method 770 according to the invention. When a peripheral unit, i.e. the sending unit, is connected to an interface unit, i.e. the recipient unit, via the wired link, the test for a wired link 771 evaluates to "yes". This triggers the interface unit to request 772 the pairing information from the connected peripheral unit. The pairing information comprises the peripheral unit device address, and the address of the interface unit with which the peripheral unit is currently paired. If the latter address is equal to the device address of the interface unit, the two units are already paired 773 and no further action is needed 774. If the two addresses are not equal the two units are not paired to each other 773. However, if the interface unit is currently engaged in a call 775, no action is performed 774. Otherwise, the interface unit triggers a pairing procedure according to the applicable standards of the wireless link 776. After pairing has been completed, the two units are paired and connected 777. The method is here described with the interface unit being the recipient unit, and thus the active unit, in performing the pairing, e.g. as applicable for a DECT link. However, depending on the wireless link used, the method may also be envisioned with the peripheral unit being the recipient unit. In that case, the peripheral unit performs all the described steps, and the interface unit merely acts as the sending unit by responding to the request 772 for pairing information from the peripheral unit.

Figure 8:
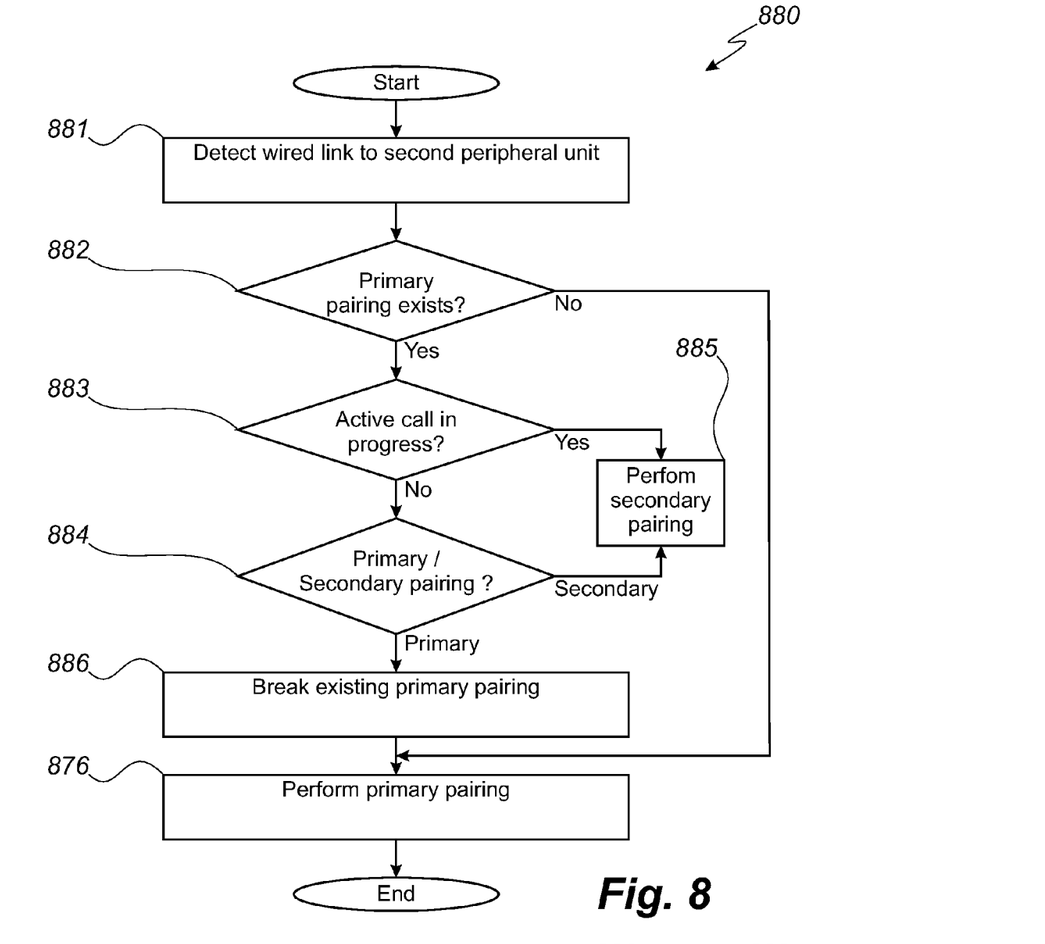
FIG. 8 is a flow chart of another embodiment of the automatic pairing method according to the invention.

FIG. 8 illustrates another embodiment of the automatic pairing method 880 according to the invention, corresponding to FIG. 7, where like reference numerals refer to like steps. Therefore, only differences between the two embodiments are described here. Firstly, connection via the wired link of a second peripheral unit is detected 881. If no primary pairing exists 882, the second peripheral unit and the interface unit is paired by a primary pairing 876 and the method ends. In case of an existing primary pairing 882 and a current call on the interface unit 883, a secondary pairing is performed 885. However, if no call is active 883, the user is prompted 884 to choose between performing a primary or secondary pairing. In the latter case, the secondary pairing is readily performed 885, and the method ends. Otherwise, the existing primary pairing is removed 886, and a new primary pairing is performed 876. The method is here described with the interface unit being the recipient unit, and thus the active unit, in performing the pairing, e.g. as applicable for a DECT link. However, depending on the wireless link used, the method may also be envisioned with the peripheral unit being the recipient unit. In that case, the peripheral unit performs all the described steps, and the interface unit merely acts as the sending unit by providing pairing to the peripheral unit.

Figure 9:
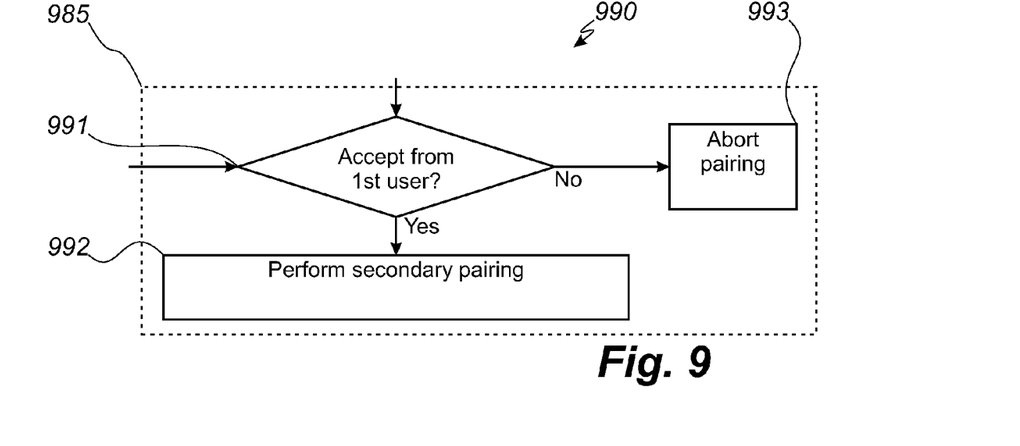
FIG. 9 is a partial flow chart of an embodiment of the automatic pairing method according to the invention.

FIG. 9 illustrates details of a variant 990 of the embodiment shown in FIG. 8, where like reference numerals refer to like steps. Therefore, only the differences between the two embodiments are described here. According to this variant, the secondary pairing 885 in FIG. 8 requires acceptance from the user of the primary peripheral unit. Thus, the secondary pairing step 985 is divided in prompting the primary user for acceptance of a secondary pairing 991. If the primary user declines, the secondary pairing procedure is aborted 993. Otherwise, secondary pairing is performed 992. Prompting of the primary user may e.g. be performed by an audio signal, while acceptance may be signalled by a button push.

The examples have been described according to preferred embodiments of the invention. However, the invention is not limited to these embodiments. For example, the peripheral unit may be any unit for audio communication suitable for connection to a telephone, such as a speaker phone or a handset.

REFERENCE NUMERAL LIST

100, 200, 300, 400 peripheral unit
101, 201, 301, 501, 601 interface unit
102, 302 wireless communication link
103, 303 telephone
104, 304 telephone network
105 wired communication link
220 headset
221 docking area
222 touch display
225 connection points
330 secondary peripheral unit
332 secondary wireless communication link
440 microphone
441 speaker
442; 542, 642 wired connection means
443; 543, 643 wireless connection means
444; 544, 644 pairing list
445; 545, 645 connection list
446; 546, 646 automatic pairing means
448; 548, 648 device address exchanging means
449; 549, 649 static PIN
447; 547, 647 link detection means
550, 650 telephone side
551, 651 peripheral unit side
552, 652 telephone connection means
664 secondary pairing list
665 secondary connection list
770 automatic pairing method (with steps 771-777)
880 automatic pairing method (with steps 881-876)
990 automatic pairing method (with steps 991-993)

The invention claimed is:

1. A wireless communication system with secure linking and authentication of multiple peripheral units to a common interface unit comprising:
    an interface unit,
    a primary peripheral unit for two way communication with said interface unit, the primary peripheral unit having a microphone and a speaker, and being connectable to a telephone link via said interface unit,
    said interface unit having a unique interface unit device address, and the primary peripheral unit having a unique peripheral unit device address,
    wherein the primary peripheral unit and said interface unit are mutually connectable via a wireless communication link for audio communication, and
    the system having a primary wired pairing routine for initially pairing the primary peripheral unit and said interface unit via a hard wired detachable connection to authenticate a link between the primary peripheral unit and said interface unit while the primary peripheral unit is in the hard wired detachable connection and before the wireless communication link is established between the primary peripheral unit and said interface unit, and
    wherein the primary wired pairing routine comprising:
        a link detector for first detecting an established wired communication link between the primary peripheral unit and said interface unit,
        an address exchanger adapted to exchange the primary peripheral unit device address and/or said interface unit device address initially via the wired communication link between the primary peripheral unit and said interface unit during a time period when said wired link has been established, wherein authenticating the primary peripheral unit, and
    the wireless communications system further comprising a secondary peripheral unit in addition to the primary peripheral unit, the primary peripheral unit being the main peripheral unit, wherein the secondary peripheral unit comprises a microphone and a speaker, and the secondary peripheral unit is connectable to the telephone link via said interface unit, the secondary peripheral unit having a unique device address, wherein the secondary peripheral unit and said interface unit are connectable to each other via a secondary wireless communication link for audio communication and the wired communication link for auxiliary data, the wired communication link being detachable, and wherein said interface unit is adapted to be simultaneously wirelessly connectable to both the primary peripheral unit and the secondary peripheral unit by the wireless communication links after the connection between the secondary peripheral unit and said interface unit have been authenticated by the wired communication link;

said authentication between the secondary peripheral unit and said interface unit including:

a pairing routine including:

a link detector for first detecting an established wired communication link between the secondary peripheral unit and said interface unit, an address exchanger adapted to exchange the secondary peripheral unit device address and/or said interface unit device address initially via the wired communication link between the secondary peripheral unit and said interface unit during a time period when the wired link has been established, wherein authenticating the second peripheral unit, to transmit telephone calls to the primary peripheral unit and the secondary peripheral unit from said interface unit when authenticated; and wherein a switch on the primary peripheral unit for accepting the pairing of the secondary peripheral unit before said secondary peripheral unit is able to have an audio connection to said interface unit, after accepting pairing, wherein said audio connection to the primary peripheral unit are simultaneously transmitted to the secondary peripheral unit, wherein the wireless communication link transmits calls to the primary and secondary peripheral units during the audio connection, and after the audio connection is completed signifying the end of a call, the secondary wireless communication link expires, so that the user of the secondary peripheral unit may not listen into subsequent calls without re-authentication.

2. The system according to claim 1, wherein detachable connection includes a docking area associated with said interface unit, wherein the docking area is adapted to accept the primary or the secondary peripheral unit for storage and/or recharging, and wherein the wired communication link is established between one of the primary or secondary peripheral units and said interface unit, when one of the peripheral units is docked in the docking area of said interface unit, whereby authentication can occur via a wired connection and without the need for data encryption via the wired connection.

3. The system according to claim 1, wherein the primary and secondary peripheral units are headsets.

4. The system according to claim 1, wherein the audio connection includes a predetermined number of audio connections and when said predetermined number of audio connection is completed the secondary wireless communication link expires, so that the user of the secondary peripheral unit may not listen into subsequent calls without re-authentication.

5. The system according to claim 1, wherein the wireless communication link transmits calls to the primary and secondary peripheral units during the audio connection and wherein the secondary wireless communication link expires either upon completion of a next active phone call wherein the user of the secondary peripheral unit may not listen into subsequent calls without re-authentication.

6. The system according to claim 2, wherein the docking area is adapted to accept a headset as a peripheral unit for docking, wherein the wired communication link is established by the docking the primary or the secondary peripheral unit in the docking area.

7. A method for secure linking and authenticating of a primary peripheral unit and an interface unit for connecting the primary peripheral unit to a telephone via said interface unit, wherein the primary peripheral unit and said interface unit are adapted to be in communication via a first wireless communication link, wherein:

the primary peripheral unit and said interface unit are adapted for being connected via a wired communication link so that at a given time one unit may function as a sending unit and the other unit may function as a recipient unit, the method comprising the steps of:

a) detecting establishment of the wired communication link between the primary peripheral unit and said interface unit, b) determining if the primary peripheral unit and said interface unit are already authenticated by previous pairing, and if previously paired, no further authentication is required, otherwise:

c) transferring a device address over the wired communication link between the primary peripheral unit and said interface unit during a time when both the primary peripheral unit and said interface unit are hard-wired to each other; completing hard-wire pairing of the primary peripheral unit and said interface unit and maintaining said hard wired pairing after disconnection of the wired communication link;

d) upon detection of a second peripheral unit being hard-wired connected to said interface unit, determining if said interface unit has previously been authenticated by previous pairing, and if previously paired, no further authentication is required, otherwise;

hard wire pairing is performed between the secondary peripheral unit and said interface unit by connecting the secondary peripheral unit to the wired communication link to said interface unit; completing hard-wire pairing of the secondary peripheral unit and maintaining said hard wired pairing after disconnection of the wired communication link;

e) requiring acceptance of pairing of the secondary peripheral unit by a user of the primary peripheral unit, before the secondary peripheral unit is able to make an audio connection to said interface unit to hear calls, where after accepting pairing, said calls to the primary peripheral unit are simultaneously transmitted to the secondary peripheral unit, wherein the wireless communication link transmits calls to the primary and secondary peripheral units during the audio connection, and after the audio connection is completed the secondary wireless communication link expires, so that the user of the secondary peripheral unit may not listen into subsequent calls without re-authentication.

8. The method of claim 7 wherein the step of requiring acceptance further includes sending a signal to the primary peripheral unit requesting acceptance and providing a user accessible switch on said primary peripheral unit to transmit an acceptance signal to said interface unit.

9. The method according to claim 7, wherein authentication of the previous pairing includes checking the device address of either of the primary or secondary peripheral and interfaces units and comparing with a list of addresses in at least one of the primary peripheral unit, secondary peripheral unit or said interface units.

10. A wireless communication system with secure linking and authentication of multiple peripheral units to a common interface unit comprising:
   an interface unit,
   a primary peripheral unit for two way communication with said interface unit, the primary peripheral unit having a microphone and a speaker, and being connectable to a telephone link via said interface unit,
   said interface unit having a unique interface unit device address, and the primary peripheral unit having a unique peripheral unit device address,
   wherein the primary peripheral unit and said interface unit are mutually connectable via a wireless communication link for audio communication, and
   the system having a primary wired pairing routine for initially pairing the primary peripheral unit and said interface unit via a hard wired detachable connection to authenticate a link between the primary peripheral unit and said interface unit while the primary peripheral unit is in the hard wired detachable connection and before the wireless communication link is established between the primary peripheral unit and said interface unit, and
   wherein the primary wired pairing routine comprising:
      a link detector for first detecting an established wired communication link between the primary peripheral unit and said interface unit,
      an address exchanger adapted to exchange the primary peripheral unit device address and/or said interface unit device address initially via the wired communication link between the primary peripheral unit and said interface unit during a time period when said wired link has been established, wherein authenticating the primary peripheral unit, and
      the wireless communications system further comprising a secondary peripheral unit in addition to the primary peripheral unit, the primary peripheral unit being the main peripheral unit, wherein the secondary peripheral unit comprises a microphone and a speaker, and the secondary peripheral unit is connectable to the telephone link via said interface unit, the secondary peripheral unit having a unique device address, wherein the secondary peripheral unit and said interface unit are connectable to each other via a secondary wireless communication link for audio communication and the wired communication link for auxiliary data, the wired communication link being detachable, and wherein said interface unit is adapted to be simultaneously wirelessly connectable to both the primary peripheral unit and the secondary peripheral unit by the wireless communication links after the connection between the secondary peripheral unit and said interface unit have been authenticated by the wired communication link;
   said authentication between the secondary peripheral unit and said interface unit including:
   a pairing routine including:
      a link detector for first detecting an established wired communication link between the secondary peripheral unit and said interface unit,
      an address exchanger adapted to exchange the secondary peripheral unit device address and/or said interface unit device address initially via the wired communication link between the secondary peripheral unit and said interface unit during a time period when the wired link has been established, wherein authenticating the second peripheral unit, to transmit telephone calls to the primary peripheral unit and the secondary peripheral unit from said interface unit when authenticated; and
      wherein a switch on the primary peripheral unit for accepting the pairing of the secondary peripheral unit before said secondary peripheral unit is able to have an audio connection to said interface unit, after accepting pairing, wherein said audio connection to the primary peripheral unit are simultaneously transmitted to the secondary peripheral unit, where a user of the second peripheral unit cannot eavesdrop on said audio connection without authorization by the user of the primary peripheral unit
      wherein, after linking the second peripheral unit to said interface unit, monitoring the connection status of the audio connection to sense a call already underway or a call initiated after linking, and after the audio connection is completed, indicating the end of a call, the secondary wireless communication link expires, so that the user of the secondary peripheral unit may not listen into subsequent calls without re-authentication.

11. The system of claim 10 wherein the current or next call includes a predetermined number of calls, after which the link to said secondary peripheral unit is terminated.

* * * * *